United States Patent
Casimiro Ericsson et al.

(10) Patent No.: US 10,715,945 B2
(45) Date of Patent: Jul. 14, 2020

(54) METHODS AND SYSTEMS FOR DETERMINING AND/OR USING AN AUDIO FILTER BASED ON HEAD-TRACKING DATA

(71) Applicant: DIRAC RESEARCH AB, Uppsala (SE)

(72) Inventors: Nilo Casimiro Ericsson, Kolmården (SE); Sead Smailagic, Helsingborg (SE)

(73) Assignee: Dirac Research AB, Uppsala (SE)

( * ) Notice: Subject to any disclaimer, the term of this patent is extended or adjusted under 35 U.S.C. 154(b) by 0 days.

(21) Appl. No.: 16/347,390

(22) PCT Filed: Oct. 24, 2017

(86) PCT No.: PCT/SE2017/051043
§ 371 (c)(1),
(2) Date: May 3, 2019

(87) PCT Pub. No.: WO2018/084770
PCT Pub. Date: May 11, 2018

(65) Prior Publication Data
US 2020/0059749 A1   Feb. 20, 2020

Related U.S. Application Data

(60) Provisional application No. 62/417,538, filed on Nov. 4, 2016.

(51) Int. Cl.
*H04R 5/02* (2006.01)
*H04S 7/00* (2006.01)
(Continued)

(52) U.S. Cl.
CPC .............. *H04S 7/303* (2013.01); *G06F 3/012* (2013.01); *H04S 3/008* (2013.01); *H04S 2400/01* (2013.01); *H04S 2420/01* (2013.01)

(58) Field of Classification Search
CPC ....................................................... H04R 5/02
See application file for complete search history.

(56) References Cited

U.S. PATENT DOCUMENTS

| 2007/0270988 A1 | 11/2007 | Goldstein et al. |
| 2013/0202117 A1 | 8/2013 | Brungart et al. |

(Continued)

FOREIGN PATENT DOCUMENTS

| EP | 1551205 A1 | 7/2005 |
| WO | 2012068174 A2 | 5/2012 |

(Continued)

OTHER PUBLICATIONS

International Search Report and Written Opinion, dated Feb. 23, 2018, in corresponding PCT application PCT/SE2017/051043.

(Continued)

*Primary Examiner* — Olisa Anwah
(74) *Attorney, Agent, or Firm* — Young & Thompson

(57) ABSTRACT

Disclosed is a method for determining an audio filter. The method includes obtaining head-tracking data representing a head pose, also referred to as a head position, relative to a torso pose of an intended subject, and selecting a representation of a Head Related Transfer Function, HRTF, from a HRTF database, based on the head-tracking data and information representative of the position and/or direction of a sound source. The method also includes determining the audio filter based on the selected HRTF representation.

20 Claims, 13 Drawing Sheets

(51) Int. Cl.
*G06F 3/01* (2006.01)
*H04S 3/00* (2006.01)

(56) References Cited

U.S. PATENT DOCUMENTS

| | | | |
|---|---|---|---|
| 2014/0355765 A1* | 12/2014 | Kulavik | H04S 7/302 |
| | | | 381/17 |
| 2016/0150339 A1 | 5/2016 | Choueiri | |
| 2016/0227338 A1 | 8/2016 | Oh et al. | |
| 2018/0007488 A1* | 1/2018 | Horowitz | G06F 3/0304 |
| 2019/0208348 A1* | 7/2019 | Reijniers | H04R 3/04 |

FOREIGN PATENT DOCUMENTS

| | | |
|---|---|---|
| WO | 2015023685 A1 | 2/2015 |
| WO | 2017051079 A1 | 3/2017 |
| WO | 2017072118 A1 | 5/2017 |

OTHER PUBLICATIONS

Farina A., "Simultaneous measurement of impulse response and distortion with a swept-sine technique.", Presented at the 108th Convention Feb. 19-22, 2000 Paris, France.

Gan, Woon-Seng; Peksi Santi; He JianJun; Ranjan Rishabh; Hai Nguyen Duy; Chaudhary Nitesh Kumar, "Personalized HRTF Measurement and 3D Audio Rendering for ARNR Headsets", JAES, May 11, 2017, AES, 60 East 42nd Street, Room 2520 New York 10165-2520, USA; whole document.

Singhal, Ayushi; Sandeep Reddy C; Hegde Rajesh M, "Computing HRTFs using Spherical Near field Acoustic Holography for rendering spatial audio", 2016 Twenty Second National Conference on Communication (NCC), Mar. 4, 2016, Tandor, India, IEEE; whole document.

Bosun Xie, "Head-Related Transfer Function and Virtual Auditory Display", J Ross Publishing, pp. 20-22, United States.

Brinkmann et. al., "Audibility and Interpolation of Head-Above-Torso Orientation in Binaural Technology", IEEE Journal of Selected Topics in Signal Processing, vol. 9, Issue 5, Aug. 2015, Berlin, Germany.

Ljung, Lennart, "Fourier Analysis", System Identification: Theory for the User (2nd edition), Prentice Hall PTR, 1999, United States.

Extended European Search Report issued in European Patent Application No. 17867872.8 dated May 12, 2020.

Extended European Search Report issued in European Patent Application No. 17866956.0 dated May 12, 2020.

Brinkmann, F. et al., "Audibility of head-above-torso orientation in head-related transfer functions," Forum Acusticum 2014, Sep. 7, 2014.

Brinkmann, F. et al., A high resolutional head-related transfer function database including different orientations of head above the torso, AIA-DAGA 2013, Mar. 19, 2013, pp. 596-599.

Valimaki, V. et aL, "Assisted Listening Using a Headset: Enhancing audio perception in real, augmented, and virtual anvironments," IEEE Signal Processing Magazine, vol. 32, No. 2, Mar. 1, 2015, pp. 92-99.

Ranjan, R. et aL, "Fast Continuous Acquisition of HRTF for Human Subjects with Unconstrained Random Head Movements in Azimuth and Elevation," 2016 AES International Conference on Headphone Technology, Aug. 19, 2016.

* cited by examiner

Azimuth (left ear) frequency response averaged over 6 subjects. Elevation ±10°, roll ±10°

Elevation front frequency response averaged over 6 subjects at Azimuth ±10°.

METHODS AND SYSTEMS FOR DETERMINING AND/OR USING AN AUDIO FILTER BASED ON HEAD-TRACKING DATA

TECHNICAL FIELD

The proposed technology generally relates to audio technology and rendering of sound over headphones or similar audio devices using audio filters. More specifically the proposed technology relates to a method for determining an audio filter, an audio filter selection system, a method for audio filtering, an audio filter system, a method for sound reproduction, a system for sound reproduction as well as corresponding computer programs and computer-program products.

BACKGROUND

In certain applications it is desired to render a sound over headphones to a listener such that the sound is perceived as coming from a specific position in space outside of the listening person's head. A typical application is Virtual Reality, where the listener would wear a Virtual Reality head-set that presents a visual image together with headphones that complement the experience with audio. Sometimes Virtual Reality is also referred to as Augmented Reality, AR, or X Reality, XR, where X stands for "unknown".

A head-tracking solution is normally used that senses which general direction a person is facing in relation to a sound source. What the person sees and hears is consequently updated in real time so that the person can look in different directions in the virtual world and get an experience of being there.

When the listener turns, the relative direction to sound sources in the virtual world changes. Head-tracking information is thus needed so that sound sources can be rendered in their correct place in the virtual world regardless of which direction the listener is facing.

By way of example, a common method used to render binaural virtual audio sources is based on convolving an audio source signal with a binaural HRTF response. The HRTF (Head Related Transfer Function) is comprised of one transfer function for each ear which has encoded in it the necessary information that the brain needs to sense the direction of the sound. Described simply, a HRTF response can be measured by placing microphones in the ears of a person, then placing a sound source at a specific angle and distance to the person and then measuring the transfer function (or equivalently, the impulse response) from the sound source to each of the listener's ears. The angle of the source is specified by the 3D polar angle in relation to the head, with origo in the center of the head.

By measuring HRTFs for a large number of directions to a person, a database of HRTFs can be constructed and this enables the rendering of virtual sound sources at many different locations as well as moving sound sources. The way that an HRTF database is normally measured is by having the person that the measurements are taken on sit still and face in a very precise direction during the measurements while the position of the sound source is changed for each measurement. Since the person sits still while the position of the sound source is changed, the head and torso of the person are kept in the same constant relation during the measurements. More information about the current state of the art in binaural technology can be found in reference [1].

SUMMARY

It is a general object to improve the manner in which an audio filter is determined and/or applied for improved sound reproduction.

It is a specific object to provide a method for determining an audio filter.

It is also an object to provide an audio filter selection system.

Another object is to provide a method for audio filtering.

Yet another object is to provide an audio filter system.

Still another object is to provide a method for sound reproduction.

It is also an object to provide a system for sound reproduction.

Another object is to provide corresponding computer programs and computer-program products.

These and other objects are met by the proposed technology as claimed herein.

According to a first aspect, there is provided a method for determining an audio filter. The method comprises:
 obtaining head-tracking data representing a head pose, also referred to as a head position, relative to a torso pose of an intended subject;
 selecting a representation of a Head Related Transfer Function, HRTF, from a HRTF database, based on the head-tracking data and information representative of the position and/or direction of a sound source;
 determining the audio filter based on the selected HRTF representation.

According to a second aspect, there is provided an audio filter selection system. The audio filter selection system is configured to obtain head-tracking data representing a head pose, also referred to as a head position, relative to a torso pose of an intended subject. The audio filter selection system is also configured to select a representation of a Head Related Transfer Function, HRTF, from a HRTF database, based on the obtained head-tracking data and information representative of the position and/or direction of a sound source. The audio filter selection system is further configured to determine an audio filter based on the selected HRTF representation.

According to a third aspect, there is provided a method for audio filtering. The method comprises:
 obtaining head-tracking data representing a head pose, also referred to as a head position, relative to a torso pose of an intended subject;
 selecting a representation of a Head Related Transfer Function, HRTF, from a HRTF database, based on the head-tracking data and information representative of the position and/or direction of a sound source;
 determining an audio filter based on the selected HRTF representation; and
 applying the audio filter on audio data.

According to a fourth aspect, there is provided an audio filter system. The audio filter system is configured to obtain head-tracking data representing a head pose, also referred to as a head position, relative to a torso pose of an intended subject. The audio filter system is also configured to select a representation of a Head Related Transfer Function, HRTF, from a HRTF database, based on the obtained head-tracking data and information representative of the position and/or direction of a sound source. The audio filter system is further configured to determine an audio filter based on the selected HRTF representation, and apply the audio filter on audio data.

According to a fifth aspect, there is provided a method for sound reproduction. The method comprises:

obtaining head-tracking data representing a head pose, also referred to as a head position, relative to a torso pose of an intended subject;

selecting a representation of a Head Related Transfer Function, HRTF, from a HRTF database, based on the head-tracking data and information representative of the position and/or direction of a sound source; and determining an audio filter based on the selected HRTF representation;

applying the audio filter on audio data to process the audio data;

applying the processed audio data to a sound system for sound reproduction.

According to a sixth aspect, there is provided a system for sound reproduction. The system is configured to obtain head-tracking data representing a head pose, also referred to as a head position, relative to a torso pose of an intended subject. The system is also configured to select a representation of a Head Related Transfer Function, HRTF, from a HRTF database, based on the obtained head-tracking data and information representative of the position and/or direction of a sound source. Further, the system is configured to determine an audio filter based on the selected HRTF representation, and apply the audio filter on audio data to process the audio data. The system is also configured to apply the processed audio data to a sound system for sound reproduction.

According to a seventh aspect, there is provided a computer program comprising instructions, which when executed by at least one processor, cause the at least one processor to:

obtain head-tracking data representing a head pose, also referred to as a head position, relative to a torso pose of an intended subject; and select a representation of a Head Related Transfer Function, HRTF, from a HRTF database, based on the head-tracking data and information representative of the position and/or direction of a sound source; and determine the audio filter based on the selected HRTF representation.

According to an eighth aspect, there is provided a computer program comprising instructions, which when executed by at least one processor, cause the processor(s) to:

obtain head-tracking data representing a head pose, also referred to as a head position, relative to a torso pose of an intended subject;

select a representation of a Head Related Transfer Function, HRTF, from a HRTF database, based on the head-tracking data and information representative of the position and/or direction of a sound source; and determine an audio filter based on the selected HRTF representation; and apply the audio filter on audio data.

According to a ninth aspect, there is provided a computer program comprising instructions, which when executed by at least one processor, cause the processor(s) to:

obtain head-tracking data representing a head pose, also referred to as a head position, relative to a torso pose of an intended subject;

select a representation of a Head Related Transfer Function, HRTF, from a HRTF database, based on the head-tracking data and information representative of the position and/or direction of a sound source; and determine an audio filter based on the selected HRTF representation;

apply the audio filter on audio data to process the audio data; and forward the processed audio data to a sound system for enabling sound reproduction.

According to a tenth aspect, there is provided a computer-program product comprising a computer-readable medium having stored thereon a computer program of any of the seventh, eighth and/or ninth aspects.

In this way, it is possible to substantially improve the manner in which an audio filter is determined and/or applied for improved sound reproduction. This novel way of determining and/or applying an HRTF-based audio filter enables significantly improved sound reproduction and especially improves the perceived locational accuracy of virtual sound sources.

The proposed technology also offers substantial improvement(s) with regard to the content and/or usefulness of an audio filter data base constructed based on HRTF measurements.

DETAILED DESCRIPTION

As mentioned, a common method used to render binaural virtual audio sources is based on convolving an audio source signal with a binaural HRTF response. The HRTF comprises a transfer function for each ear which has encoded in it the necessary information that the brain needs to sense the direction of the sound. Described simply, a HRTF response can be measured by placing microphones in the ears of a person, then placing a sound source at a specific angle and distance to the person and then measuring the transfer function (or equivalently, the impulse response) from the sound source to each of the listener's ears. The angle of the source is specified by the 3D polar angle in relation to the head, with origo in the center of the head.

We argue that the above described procedure for measuring HRTFs is problematic. This is because in a natural situation, a person often tends to move the head to look in different directions while keeping the torso static. What the above procedure emulates is a situation where a person moves the whole body while keeping the head static in relation to the body. HRTFs contain information both about the complex response of the pinna and head diffraction, but also about the reflections from the torso. The reflection pattern from the torso changes depending on the pitch, roll and yaw of the head in relation to the torso. An example of a study of the influence of the yaw-dimension can be found in reference [2].

Humans actively move their head and body when orienting or localizing sounds. So in order to capture HRTFs related to these dynamic head and body movements a dynamic head-tracker-based HRTF system is proposed. This solution opens up for a completely new dimension, creating a set of HRTFs based on the head's rotation around the X- and/or Z-axis in relation to the torso, see FIG. 2. However, also rotation around the Y-axis is a new dimension, as there is no public record of creating a database or a 3D sound rendering system including either of these rotational dimensions.

Figure 1A:
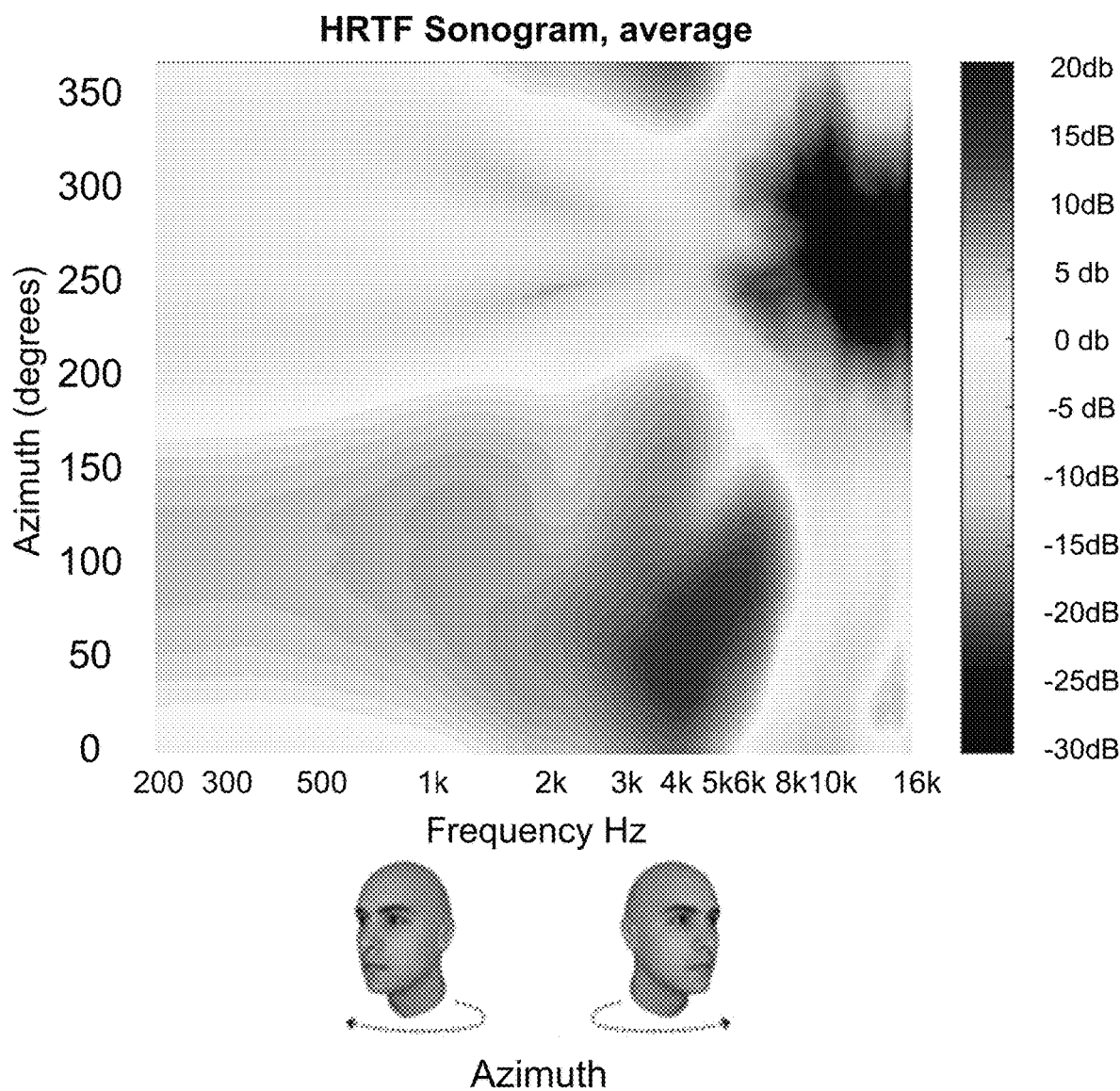
FIGS. 1A-C are schematic diagrams illustrating examples of sonograms of HRTFs and show that the HRTFs are strongly dependent on the head pose relative to the torso pose.
Figure 1B:
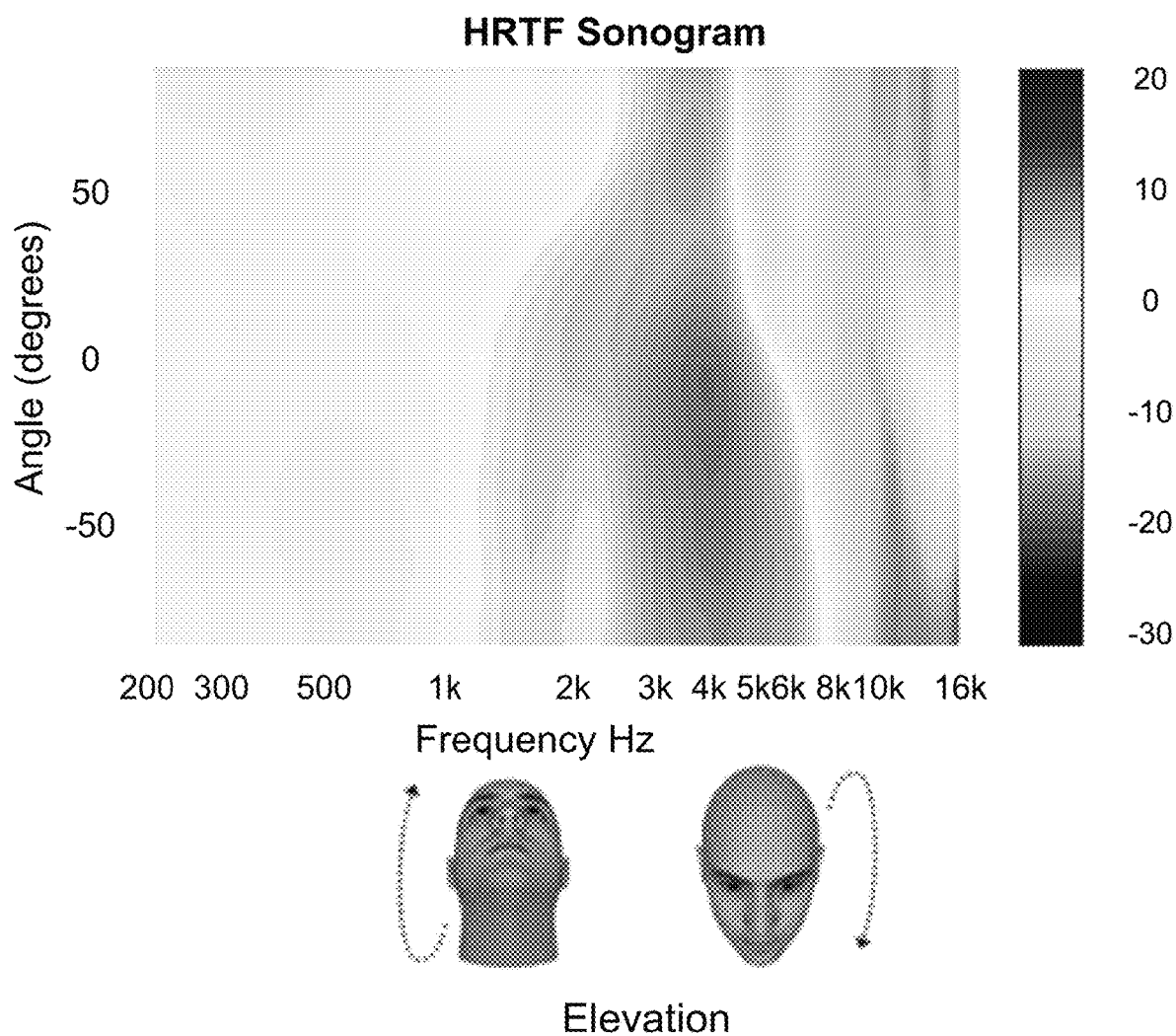
Figure 1C:
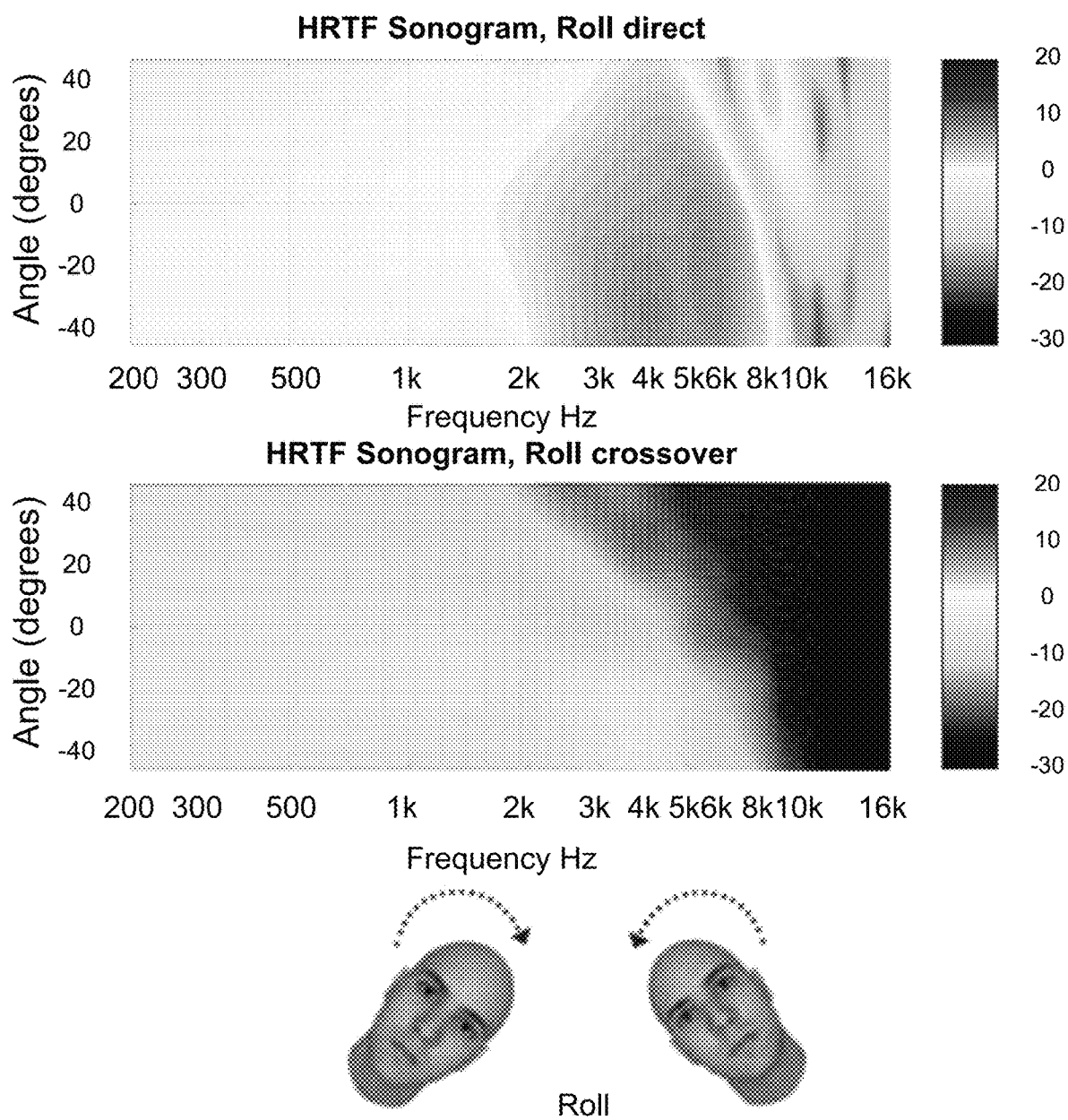

Our research shows that the influence on the HRTFs due to isolated head movements as described herein is important to model correctly when simulating virtual audio sources, that modeling it correctly improves perceived locational accuracy and finally that it alleviates the need for individualization of HRTFs. It is a highly complex task to measure and determine these dynamical HRTFs with a high degree of accuracy and resolution in the pitch, roll and yaw dimensions. Our novel system implementation for HRTF measurements described below has therefore been critical to verify that our hypothesis is indeed correct. Sonograms of HRTFs obtained from our measurement system, see FIGS. 1A-C, show that the HRTFs are strongly dependent on the head pose, also referred to as head position, relative to the torso pose. Our hypothesis has also been verified by subjective listening evaluations.

Figure 10:
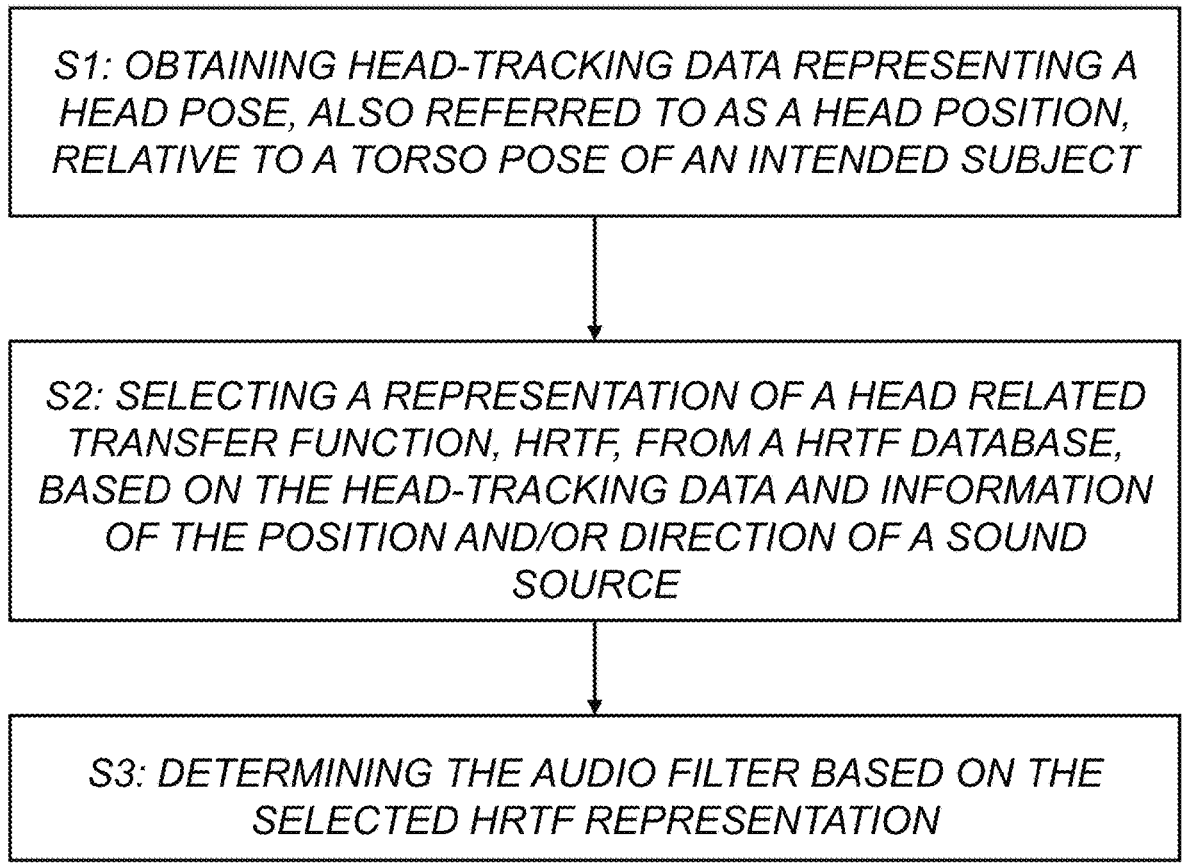
FIG. 10 is a schematic flow diagram illustrating an example of a novel method for determining an audio filter.

According to different aspects of the proposed technology, there is provided at least:
- a method and system for constructing a filter database using head-tracking data
- a filter database such as database of binaural HRTFs
- a head-tracking-based filter selection system and a corresponding method
- a head-tracking-based filter system and a corresponding method
- a corresponding method and system for sound reproduction, such as a method for rendering of binaural 3D sound and a binaural 3D sound rendering system
- corresponding computer programs and computer-program products FIG. 10 is a schematic flow diagram illustrating an example of a novel method for determining an audio filter. In the example of FIG. 10, the method comprises:

S1: obtaining head-tracking data representing a head pose, also referred to as a head position, relative to a torso pose of an intended subject;

S2: selecting a representation of a Head Related Transfer Function, HRTF, from a HRTF database, based on the head-tracking data and information representative of the position and/or direction of a sound source; and S3: determining the audio filter based on the selected HRTF representation.

By way of example, the representation of the HRTF includes at least a subset of the HRTF and/or a processed version of at least a subset of the HRTF.

For example, the HRTF representation may be selected for use as the audio filter or for use as input to determine the audio filter by means of additional calculations.

In a particular example, the HRTF database comprises a number of representations of Head Related Transfer Functions, HRTFs stored in the memory locations of the database. Each HRTF representation may be stored together with associated head-tracking data representing a head pose relative to a torso pose of an intended subject and information representative of the position and/or direction of a sound source. The obtained head-tracking data may then be used together with obtained information representative of the position and/or direction of a sound source as input to the HRTF database to find matching head-tracking and position/direction data stored in the HRTF database and extracting the associated HRTF representation from the HRTF database.

As an example, the HRTF database may comprise representations of binaural HRTFs and the selected HRTF representation may be a representation of a binaural HRTF associated in the database with stored head-tracking data matching the obtained head-tracking data used as input to the HRTF database.

Preferably, the head pose input is combined with source direction information to select one or more representations of HRTFs from the HRTF database.

According to another aspect, there is provided an audio filter selection system. The audio filter selection system is configured to obtain head-tracking data representing a head pose, also referred to as a head position, relative to a torso pose of an intended subject, wherein the audio filter selection system is configured to select a representation of a Head Related Transfer Function, HRTF, from a HRTF database, based on the obtained head-tracking data and information representative of the position and/or direction of a sound source, and wherein the audio filter selection system is configured to determine an audio filter based on the selected HRTF representation.

Figure 3:
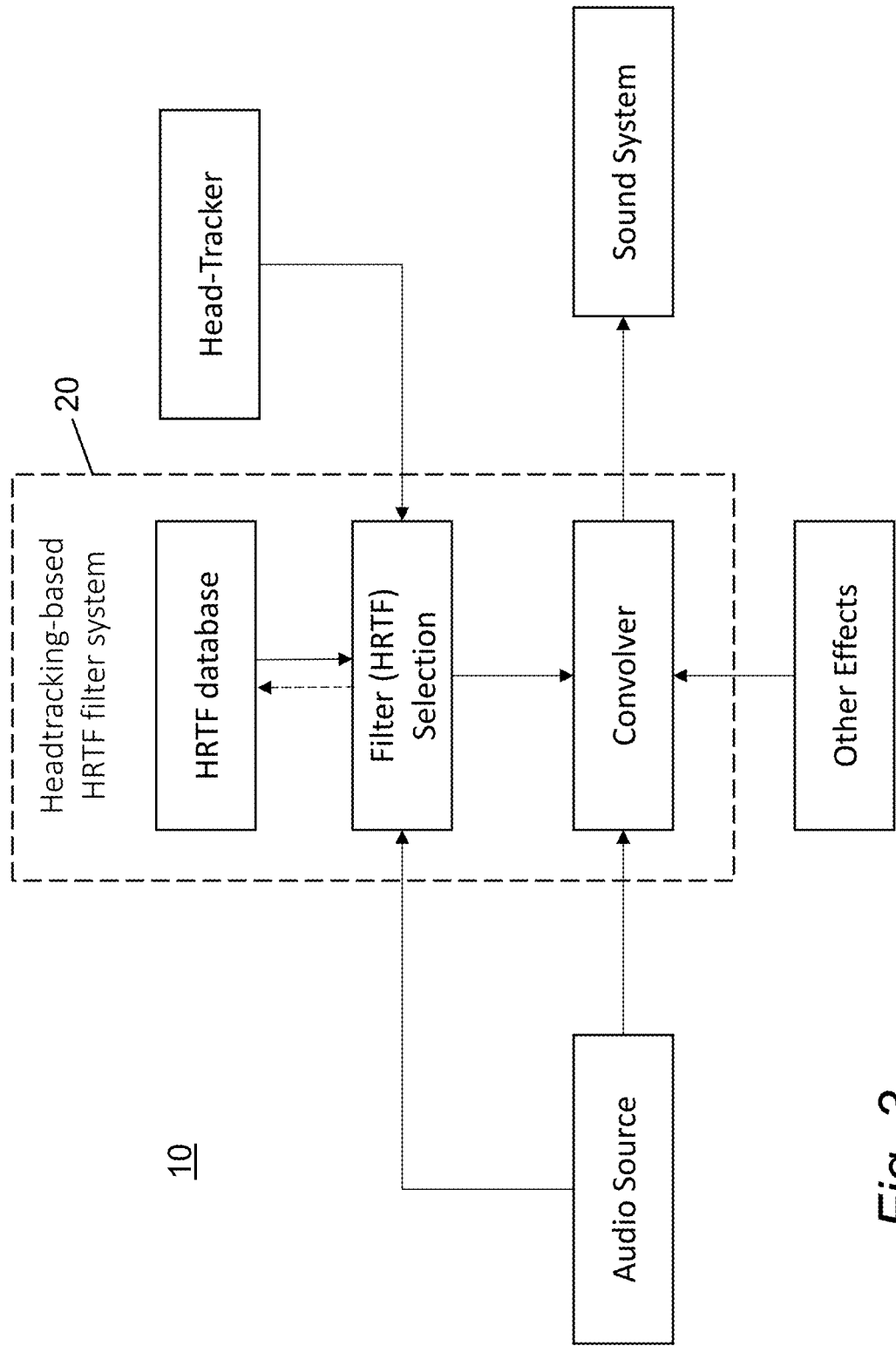
FIG. 3 is a schematic block diagram illustrating an example of an overview of a sound rendering system.
Figure 5:
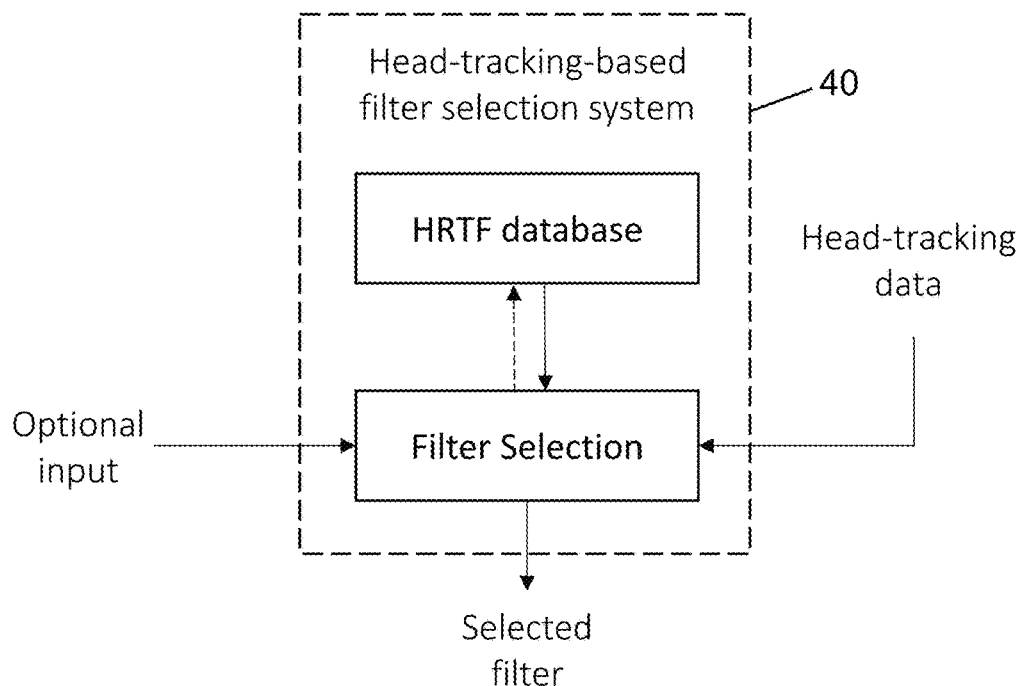
FIG. 5 is a schematic block diagram illustrating an example of a filter selection system.
Figure 8:
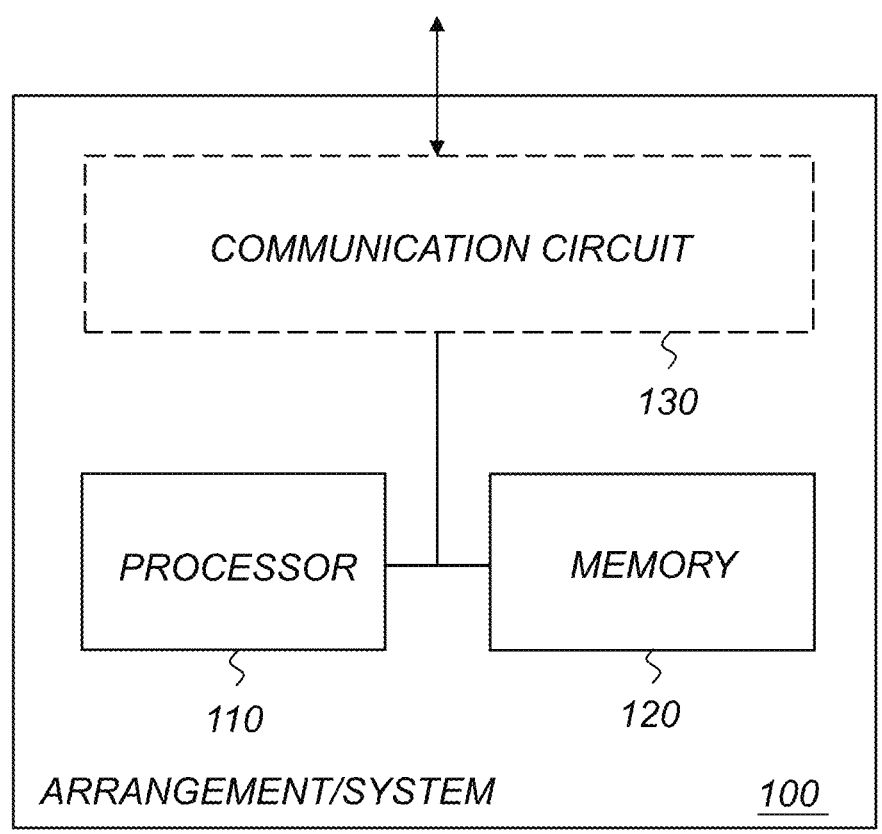
FIG. 8 is a schematic block diagram illustrating an example of an arrangement/system, based on a processor-memory implementation according to an embodiment.

By way of example, reference can be made to the example implementations of FIG. 3, FIG. 5 and/or FIG. 8.

As an of example, the representation of the HRTF may include at least a subset of the HRTF and/or a processed version of at least a subset of the HRTF.

For example, the audio filter selection system may be configured to select the HRTF representation for use as the audio filter or for use as input to determine the audio filter by means of additional calculations.

In a particular example, the audio filter selection system comprises an audio filter selection block configured to use the head-tracking data to select the HRTF representation from the HRTF database. For example, reference can be made to FIG. 3 and/or FIG. 5.

As an example, the audio filter selection block may be a HRTF selection block configured to combine the head pose input from a head tracker and source direction information from an audio source block to select one or more representations of HRTFs from the HRTF database.

According to a particular example, the HRTF database comprises a number of representations of Head Related Transfer Functions, HRTFs stored in the memory locations of the database, wherein each HRTF representation is stored together with associated head-tracking data representing a head pose relative to a torso pose of an intended subject and information representative of the position and/or direction of a sound source. The audio filter selection system may be configured to use the obtained head-tracking data together with obtained information representative of the position and/or direction of a sound source as input to the HRTF database to find matching head-tracking and position/direction data stored in the HRTF database and extract the associated HRTF representation from the HRTF database.

Optionally, the HRTF database comprises representations of binaural HRTFs and the audio filter selection system is configured to select a representation of a binaural HRTF associated in the database with stored head-tracking data matching the obtained head-tracking data used as input to the HRTF database.

Preferably, the audio filter selection system is configured to combine head pose input with source direction information to select one or more representations of HRTFs from the HRTF database.

As schematically indicated in the example of FIG. 5, the audio filter selection system comprises the HRTF database. However, it should be understood that it is sufficient for the audio filter selection system to have access to such a HRTF database. The database may even be remotely located, e.g. as an online database.

In a particular example, the audio filter selection system comprises a processor and a memory, the memory comprising instructions executable by the processor, whereby the processor is operative to select a HRTF representation from the HRTF database based on the obtained head-tracking data. For example, reference can be made to the example implementation of FIG. 8, which will be described in more detail later on.

Figure 11:
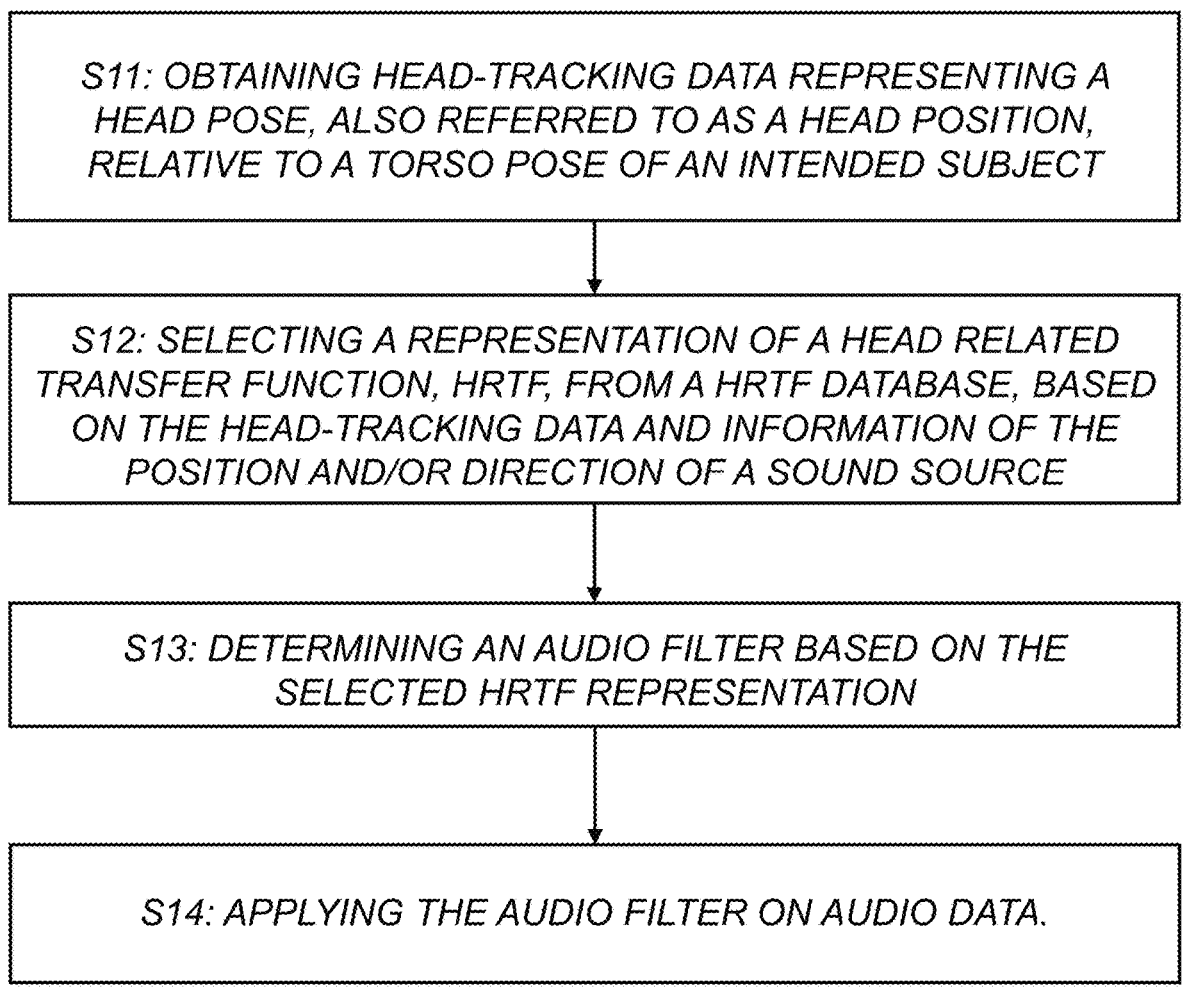
FIG. 11 is a schematic flow diagram illustrating an example of a novel method for audio filtering.

FIG. 11 is a schematic flow diagram illustrating an example of a novel method for audio filtering. In this example, the method comprises:

S11: obtaining head-tracking data representing a head pose, also referred to as a head position, relative to a torso pose of an intended subject;

S12: selecting a representation of a Head Related Transfer Function, HRTF, from a HRTF database, based on the head-tracking data and information representative of the position and/or direction of a sound source;

S13: determining an audio filter based on the selected HRTF representation;

S14: applying the audio filter on audio data.

By way of example, the representation of the HRTF may include at least a subset of the HRTF and/or a processed version of at least a subset of the HRTF.

For example, the HRTF representation may be selected for use as the audio filter or for use as input to determine the audio filter by means of additional calculations.

In a particular example, the HRTF database comprises a number of representations of Head Related Transfer Functions, HRTFs stored in the memory locations of the database, wherein each HRTF representation is stored together with associated head-tracking data representing a head pose relative to a torso pose of an intended subject and information representative of the position and/or direction of a sound source. The obtained head-tracking data is used together with obtained information representative of the position and/or direction of a sound source as input to the HRTF database to find matching head-tracking and position/direction data stored in the HRTF database and extracting the associated HRTF representation from the HRTF database.

Preferably, the head pose input is combined with source direction information to select one or more HRTFs from the HRTF database.

According to another aspect, there is provided an audio filter system. The audio filter system is configured to obtain head-tracking data representing a head pose, also referred to as a head position, relative to a torso pose of an intended subject. The audio filter system is also configured to select a representation of a Head Related Transfer Function, HRTF, from a HRTF database, based on the obtained head-tracking data and information representative of the position and/or direction of a sound source, and the audio filter system is configured to determine an audio filter based on the selected HRTF representation. The audio filter system is further configured to apply the audio filter on audio data.

Figure 6:
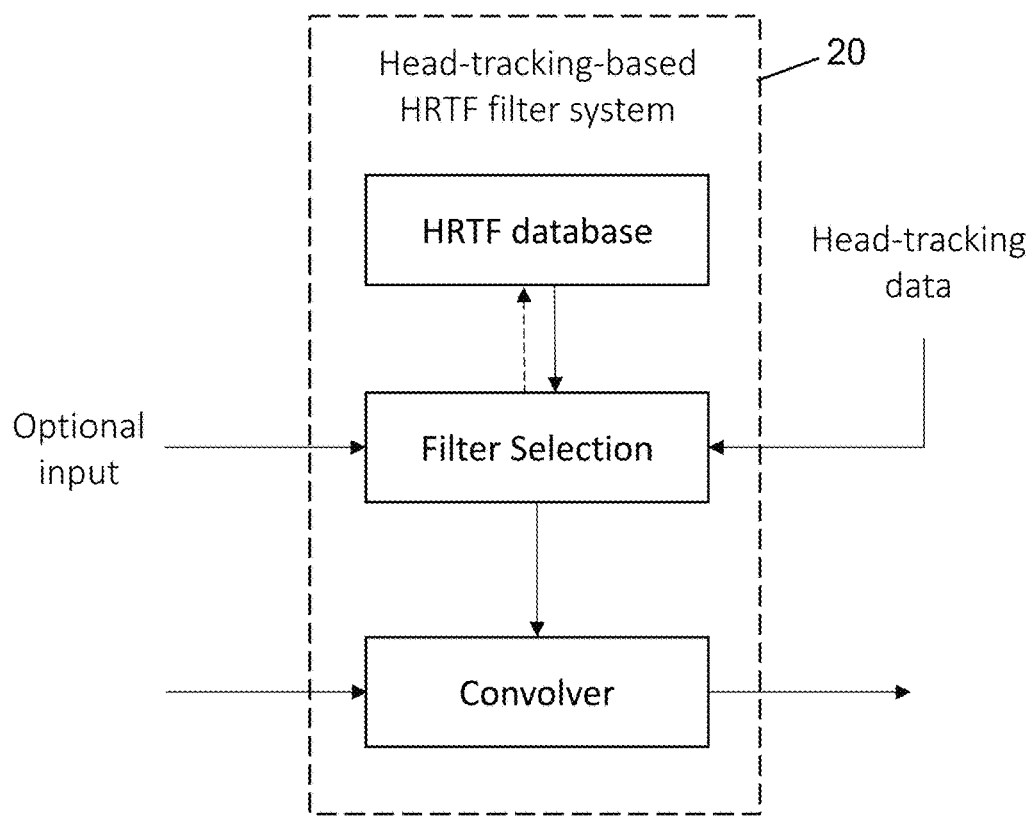
FIG. 6 is a schematic block diagram illustrating an example of a HRTF filter system.

By way of example, reference can be made to the example implementations of FIG. 3, FIG. 6 and/or FIG. 8.

By way of example, the representation of the HRTF includes at least a subset of the HRTF and/or a processed version of at least a subset of the HRTF.

For example, the audio filter system is configured to select the HRTF representation for use as the audio filter or for use as input to determine the audio filter by means of additional calculations.

As schematically indicated in the example of FIG. 6, the audio filter system comprises a filter selection block configured to use the head-tracking data to select or determine the audio filter in cooperation with the HRTF database.

For example, the filter selection block may be a HRTF selection block configured to combine the head pose input from a head tracker and source direction information from an audio source block to select one or more representations of HRTFs from the HRTF database.

In a particular example, the HRTF database comprises a number of representations of Head Related Transfer Functions, HRTFs stored in the memory locations of the database, wherein each HRTF representation is stored together with associated head-tracking data representing a head pose relative to a torso pose of an intended subject and information representative of the position and/or direction of a sound source. The audio filter system may then be configured to use the obtained head-tracking data together with obtained information representative of the position and/or direction of a sound source as input to the HRTF database to find matching head-tracking and position/direction data stored in the HRTF database and extract the associated HRTF representation from the HRTF database.

As schematically indicated in the examples of FIG. 3 and/or FIG. 6, the audio filter system may comprise a convolver or equivalent processing block configured to apply the filter to the audio data.

Optionally, the audio filter system comprises the HRTF database. However, it should be understood that it is sufficient for the audio filter selection system to have access to such a HRTF database. The database may even be remotely located, e.g. as an online database.

According to a particular example, the audio filter system comprises a processor and a memory, the memory comprising instructions executable by the processor, whereby the processor is operative to select the HRTF representation, determine the audio filter and apply the audio filter to the audio data. For example, reference can be made to the example implementation of FIG. 8, which will be described in more detail later on.

Figure 12:
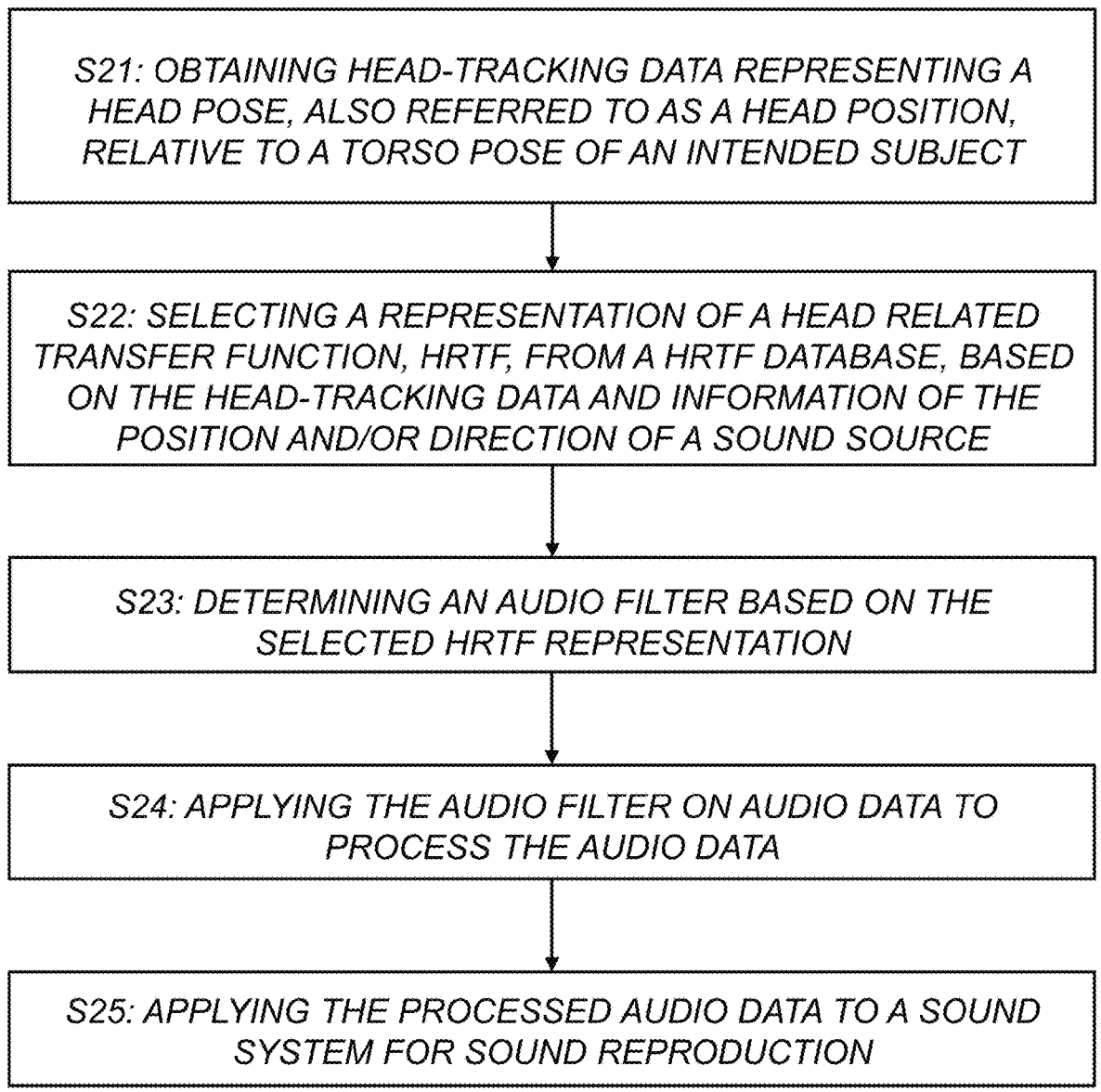
FIG. 12 is a schematic flow diagram illustrating an example of a novel method for sound reproduction.

FIG. 12 is a schematic flow diagram illustrating an example of a novel method for sound reproduction. In this example, the method comprises:

S21: obtaining head-tracking data representing a head pose, also referred to as a head position, relative to a torso pose of an intended subject;

S22: selecting a representation of a Head Related Transfer Function, HRTF, from a HRTF database, based on the head-tracking data and information representative of the position and/or direction of a sound source;

S23: determining an audio filter based on the selected HRTF representation;

S24: applying the audio filter on audio data to process the audio data; and

S25: applying the processed audio data to a sound system for sound reproduction.

By way of example, the representation of the HRTF includes at least a subset of the HRTF and/or a processed version of at least a subset of the HRTF.

For example, the HRTF representation may be selected for use as the audio filter or for use as input to determine the audio filter by means of additional calculations.

In a particular example, the HRTF database comprises a number of representations of Head Related Transfer Functions, HRTFs stored in the memory locations of the database, wherein each HRTF representation is stored together with associated head-tracking data representing a head pose relative to a torso pose of an intended subject and information representative of the position and/or direction of a sound source. The obtained head-tracking data may then be used together with obtained information representative of the position and/or direction of a sound source as input to the HRTF database to find matching head-tracking and position/direction data stored in the HRTF database and extracting the associated HRTF representation from the HRTF database.

Preferably, the head pose input is combined with source direction information to select one or more HRTFs from the HRTF database.

As an example, several audio sources at different positions in space may be rendered along a 3D trajectory in space by taking input from the trajectory to apply an appropriate HRTF at any given time, and several HRTF-processed audio sources may thus be superposed for output to the sound system.

According to another aspect, there is provided a system for sound reproduction. The system is configured to obtain head-tracking data representing a head pose, also referred to as a head position, relative to a torso pose of an intended subject. The system is also configured to select a representation of a Head Related Transfer Function, HRTF, from a HRTF database, based on the obtained head-tracking data and information representative of the position and/or direction of a sound source. Further, the system is configured to determine an audio filter based on the selected HRTF representation, and the system is configured to apply the audio filter on audio data to process the audio data. The system is also configured to apply the processed audio data to a sound system for sound reproduction.

By way of example, reference can be made to the example implementations of FIG. 3 and/or FIG. 8.

As an example, the representation of the HRTF may include at least a subset of the HRTF and/or a processed version of at least a subset of the HRTF.

For example, the system may be configured to select the HRTF representation for use as the audio filter or for use as input to determine the audio filter by means of additional calculations.

In a particular example, the system comprises a filter selection block configured to use the head-tracking data to select or determine the audio filter in cooperation with the HRTF database.

For example, the filter selection block may be a HRTF selection block configured to combine the head pose input from a head tracker and source direction information from an audio source block to select one or more representations of HRTFs from the HRTF database.

According to a particular example, the HRTF database comprises a number of representations of Head Related Transfer Functions, HRTFs stored in the memory locations of the database, wherein each HRTF representation is stored together with associated head-tracking data representing a head pose relative to a torso pose of an intended subject and information representative of the position and/or direction of a sound source. The system may then be configured to use the obtained head-tracking data together with obtained information representative of the position and/or direction of a sound source as input to the HRTF database to find matching head-tracking and position/direction data stored in the HRTF database and extract the associated HRTF representation from the HRTF database.

Optionally, the system comprises a convolver or equivalent processing block configured to apply the filter to the audio data.

Optionally, the system comprises the HRTF database. However, it should be understood that it is sufficient for the audio filter selection system to have access to such a HRTF database. The database may even be remotely located, e.g. as an online database.

In a particular example, the system is a sound rendering system, which is configured to use the HRTF database, a head-tracking device, audio input for a sound source at a desired position and select and apply appropriate representations of HRTFs from the database to output audio data for the sound system.

For example, the head-tracking device may be configured to produce real-time data about a person's head pose.

By way of example, the system may be configured for producing virtual sound sources taking into account the effect of the head pose relative to the torso pose, in addition to the direction of the sound source in relation to the torso.

Optionally, the system may be configured to process several sound sources at different positions by parallel rendering blocks.

Also, the system may optionally be configured to render several audio sources at different positions in space along a 3D trajectory in space by taking input from the trajectory to apply an appropriate HRTF representation at any given time, and to superpose several HRTF-processed audio sources for output to the sound system.

As an example, the system may be configured to create a virtual home theater loudspeaker set-up by combining virtual sound sources positioned in a home theater configuration.

For example, the system may be a binaural 3D sound rendering system.

Examples of possible implementation options include implementing the system with a mobile phone, a computer, a tablet, a headphone, or a Virtual Reality, Augmented Reality and/or so-called X Reality headset. Other examples are of course also feasible.

As schematically illustrated in FIG. 8, the system may for example comprise a processor and a memory, the memory comprising instructions executable by the processor, whereby the processor is operative to select the HRTF representation, determine the audio filter, apply the audio filter to the audio data and apply the processed audio data to a sound system for sound reproduction.

With the proposed technology, it is possible to substantially improve the manner in which an audio filter is determined and/or applied for improved sound reproduction.

The proposed technology offers substantial improvement(s) with regard to the content and/or usefulness of an audio filter data base constructed based on HRTF measurements.

For the interested reader it may be useful to distinguish between the respective scopes of a virtual sound source and a virtual sound object. For example, this may be done in the following way:

A virtual sound source is conceptually related to the audio rendering system, whereas a virtual sound object is conceptually related to the audio content in the virtual space.

A virtual sound object may be defined as an audio stream or clip that has a position (and a velocity) in a virtual space.

Not until one has defined also the position (and velocity) of a listener in this virtual space, it can be rendered as intended for that listener. This rendering may include creating reflections (maybe as new virtual sound objects), room reverberation, distance gain reduction, occlusion gain reduction and coloration, doppler effect, and HRTF-like processing for binaural playback.

By way of example, a virtual sound source may be defined as a passage from the virtual space to the audio rendering system, possibly including psychoacoustic processing, such as HRTFs.

The following two examples illustrate that there may be a confusion between virtual sound source and virtual sound object:

A naïve approach to rendering a virtual sound object is to create one virtual sound source for each virtual sound object. There is a 1:1 correspondence between the two. This could be computationally demanding for an audio rendering system when the number of virtual sound objects, and hence the number of simultaneously processed HRTF filters increase, but may make sense when it is small.

A less demanding approach, at least when the number of virtual sound objects increase, would be to project the virtual sound objects onto a smaller set of fixed virtual sound sources. The virtual sound sources could be regarded as a set of virtual loudspeakers surrounding the listener, each virtual loudspeaker having a given HRTF representation depending on the pose of the listener's head. The projection would be attained by means of panning the virtual sound objects' audio clips across the virtual loudspeakers closest to the angle of arrival of the virtual sound object.

For example, the source direction may be defined as the direction to the virtual sound source relative to the listeners general position (e.g. defined by the listener's torso). The head pose is registered separately by the head tracker. Together, the head pose and the source direction, determine a unique representation of a HRTF (Dynamic HRTF).

When acquiring data for creating a HRTF database, it is possible to use physical reference loudspeakers to represent virtual sound sources. They may be placed at certain positions relative to the intended subject to coincide with the source direction. By letting the subject move his/her head wearing a head tracker while playing excitation sounds in the reference loudspeaker, it is possible to acquire the HRTF for a specific head pose and source direction.

For a better understanding, the proposed technology will now be described with reference to non-limiting examples.

By way of example, there is provided a database of HRTFs, e.g. binaural HRTFs, and a method and system for measuring and constructing the HRTFs, associated with the head pose relative to the torso pose in addition to the sound source's direction in relation to the torso.

The database stores HRTFs and associated head-tracking data, created by audio measurements on one or more subjects.

Figure 2:
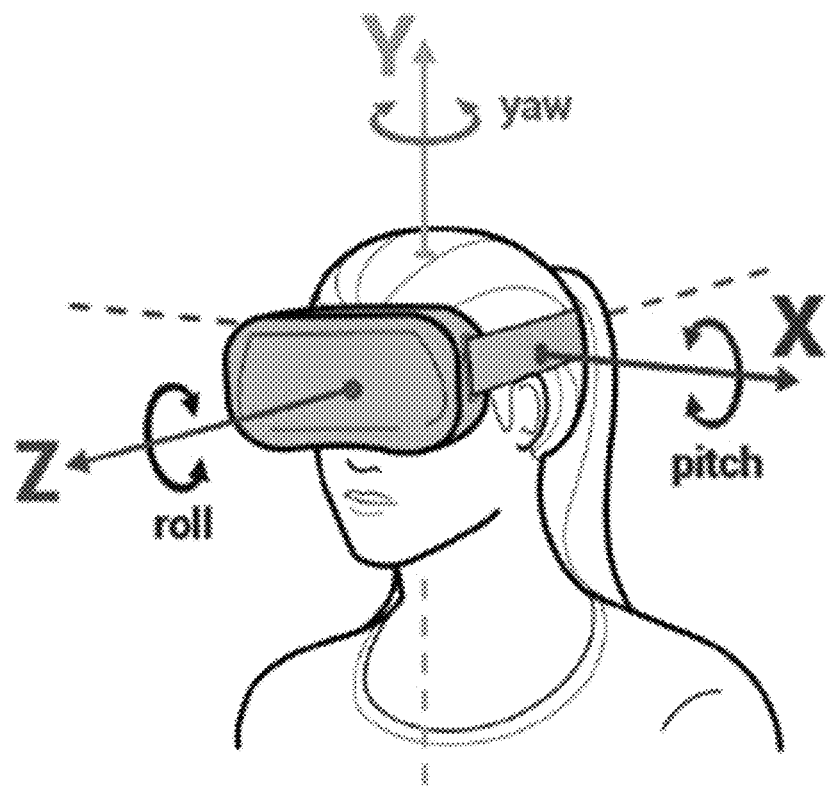
FIG. 2 is a schematic diagram illustrating examples of the pose, or position, of the head in terms of pitch, roll and/or yaw.

The pose, or position, of the head can be described in terms of pitch, roll and/or yaw (see FIG. 2).

The term "head-tracking device" or "head-tracker" shall be understood to denote a device which tracks the head pose relative to the torso, typically in addition to the direction relative to a given sound source.

An HRTF database can be created by measuring HRTFs for a sound source at a certain position for all three dimensions (pitch, roll and yaw) of the head pose relative to the torso pose, or a subset thereof (for example only pitch and roll).

To create the HRTFs stored in the database, we may by way of example use a binaural HRTF capturing system including a head-tracking device tracking the head's pitch, roll and yaw in relation to the torso, microphones at the ears, a sound source at a known position, and software running on a computer connected to the aforementioned devices, or a more general system as described later on.

The system can extract individual HRTFs or combine several individuals' HRTFs into an HRTF which represents a typical person (a "universal HRTF"). Individual aspects of each person's HRTF, such as the ITD (Interaural Time Difference), can also be extracted.

We denote an HRTF associated with both the head pose relative to the torso pose and the sound source's direction in relation to the torso, a dynamic HRTF.

Another aspect of the proposed technology concerns a system for sound reproduction such as a binaural 3D sound rendering system for producing virtual sound sources taking into account the effect of the head pose relative to the torso pose, in addition to the direction of the sound source in relation to the torso, using an HRTF database as described above. A virtual sound source can for example be a virtual loudspeaker.

In brief, the rendering system may use the HRTF database, a head-tracking device, audio input for a sound source at a desired position and selects and applies appropriate HRTFs from the database to output audio data for a sound system. Several sound sources at different positions can be processed by parallel rendering blocks. For example, a virtual home theater loudspeaker set-up could be created by combining for example five virtual sound sources positioned in a typical home theater configuration.

The dimensions (pitch, roll and yaw) considered can be three dimensions, two dimensions or even a single dimension. Preferably, at least two dimensions are considered for the HRTF database, even though the use of a single dimension in a HRTF database for a head-tracking-based sound rendering system is also included in the scope of the proposed technology. A basic idea is to capture also the influence on the HRTFs due to isolated head movements relative to the torso.

FIG. 3 is a schematic block diagram illustrating an example of an overview of a sound rendering system. By way of example, the sound rendering system 10 may be a binaural 3D sound rendering system using real-time head-tracking.

The overall system includes an audio source, a head-tracking-based HRTF filter system 20, a head-tracker and an associated sound system, and an optional block for considering other effects. By way of example, the HRTF filter system includes a HRTF database, a filter selection block and a convolver.

In this example, the Audio Source block produces the audio that is supposed to be rendered at a specific point in space as well as the direction of the virtual source. The audio data enters the convolver block and the direction data enters the HRTF Selection block.

The HRTF database block includes HRTFs for a set of measured directions.

The Head-Tracker block produces real-time data about a person's head pose.

By way of example, the HRTF Selection block combines the head pose input from the Head Tracker block and the direction information from the Audio Source block to select one or more HRTFs from the HRTF database, and calculating the proper HRTF given the head pose and source direction information. Each HRTF can be for example an FIR filter or an IIR filter, or a combination, in cascade or in parallel, thereof.

As an example, the Convolver block convolves the selected HRTF with the audio data from the Audio Source block and sends it to the Sound System block.

The Sound System block represents an audio system that is configured to deliver an audio signal such as a binaural audio signal to a listener.

The Other Effects block is an optional block that may add e.g. room effects like reflections to the sound.

The blocks mentioned may be in the form of a software implementation running on for example a mobile phone, a PC, a headphone, or a Virtual Reality and/or Augmented Reality headset. Each block can run on any other processing device with sufficient memory and CPU cycles. The Head-Tracker, the Audio Source, the Other Effects block and the Sound System each provides input and/or output for our system as described above.

The systems described herein can be made more efficient by removing the Interaural Time Difference, ITD, from the HRTF and applying it as a separate delay line rather than within the Convolver block.

Figure 4:
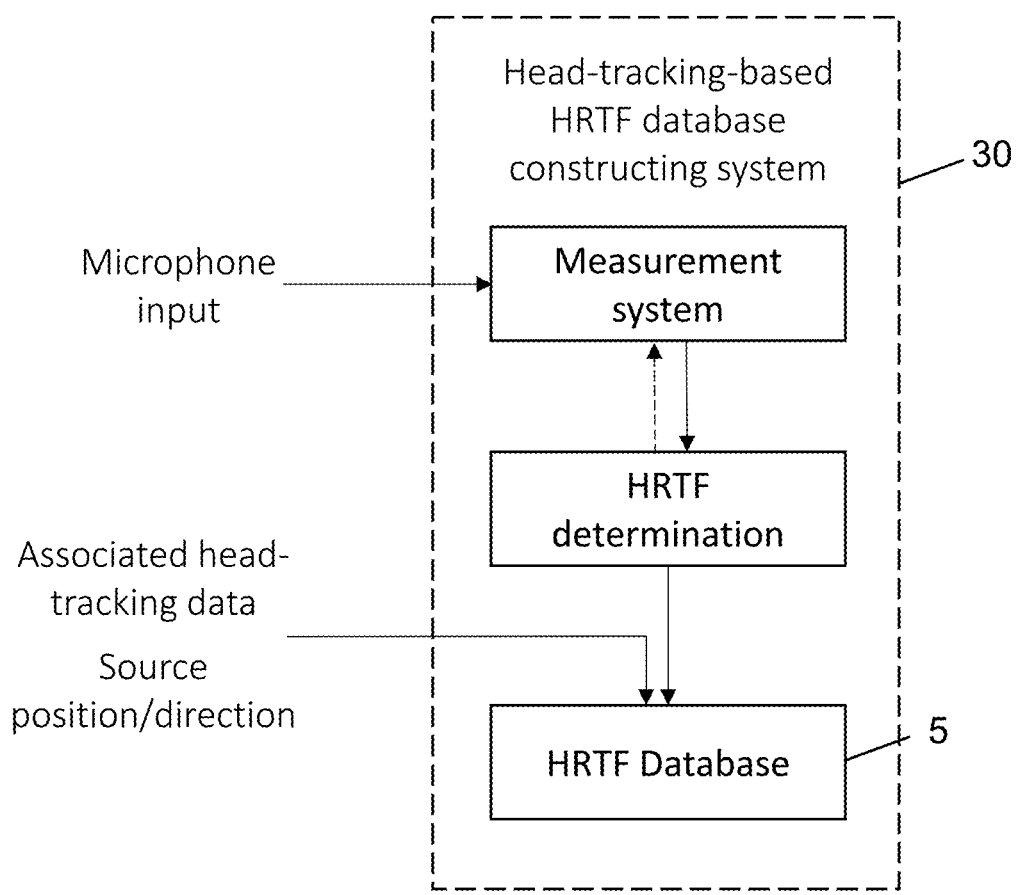
FIG. 4 is a schematic block diagram illustrating an example of a head-tracking-based HRTF database constructing system.

FIG. 4 is a schematic block diagram illustrating an example of a head-tracking-based HRTF database constructing system. The HRTF database constructing system 30 includes a measurement system, a HRTF determination block and an HRTF database for storing calculated HRTFs together with associated head-tracking data.

The system of FIG. 4 can be regarded as a system for constructing a database of dynamic HRTFs.

By way of example, the Measurement system uses Microphone input that may be providing, as input, the recording of the sound at each ear from a known sound source. For example, a microphone in each ear may capture audio data and this may be used as input to the HRTF database constructing system. The position of the sound source is known as well as the audio data sent to the sound source. Based on the recorded audio data from the two microphones, the HRTF determination block extracts the associated binaural HRTF and may for example output it as digital filters (FIR, IIR or any combination thereof), one for each ear, to the HRTF database. Associated head-tracking data (such as pitch, roll and/or yaw of the head) and the sound source position are stored with each binaural HRTF.

The HRTF determination block can for example be implemented in various ways using system identification. In essence it deconvolves the measurements with the known audio data sent to the sound source. See for example [3] or [4]. In practice, smoothing and interpolation can be useful to create better models than basic deconvolution. To reduce the memory requirements of the HRTF database the ITD can be extracted from the HRTF impulse response using for example cross-correlation or zero-crossing detection to the left of the main peak of the impulse response of the HRTF.

The filter database constructed using for example the system described herein, may thus store a number of dynamic HRTFs, each one either represented by FIR filters or by IIR filters or a combination thereof, in either case either as a (binaural) HRTF describing an individual person's binaural HRTF or a universal (binaural) HRTF representative of a large number of persons, together with the associated position of the sound source in relation to the person, and the head pose (described by pitch, roll and yaw or a subset thereof) in relation to the torso pose.

FIG. 5 is a schematic block diagram illustrating an example of a filter selection system. The filter selection system 40 includes a HRFT database (or at least access to such a database), and a filter selection block. The filter selection block uses head-tracking data, and information representative of the position and/or direction of the sound source possibly together with other optional input, to select a suitable HRTF from the database for use more or less directly as a filter or for use as input to determine a suitable filter by means of additional calculations. The system is configured to output the filter selected by the Filter Selection block, e.g. for use by a convolver to apply the filter to the audio data.

FIG. 6 is a schematic block diagram illustrating an example of a HRTF filter system. The HRTF filter system 20 includes a HRFT database (or at least access to such a database), and a filter selection block and a Convolver or equivalent block. The filter selection block uses head-tracking data, and information representative of the position and/or direction of the sound source possibly together with other optional input, to select or determine a filter in cooperation with the HRTF database. The system is configured to use the selected filter by a convolver to apply the filter to the audio data.

Figure 7:
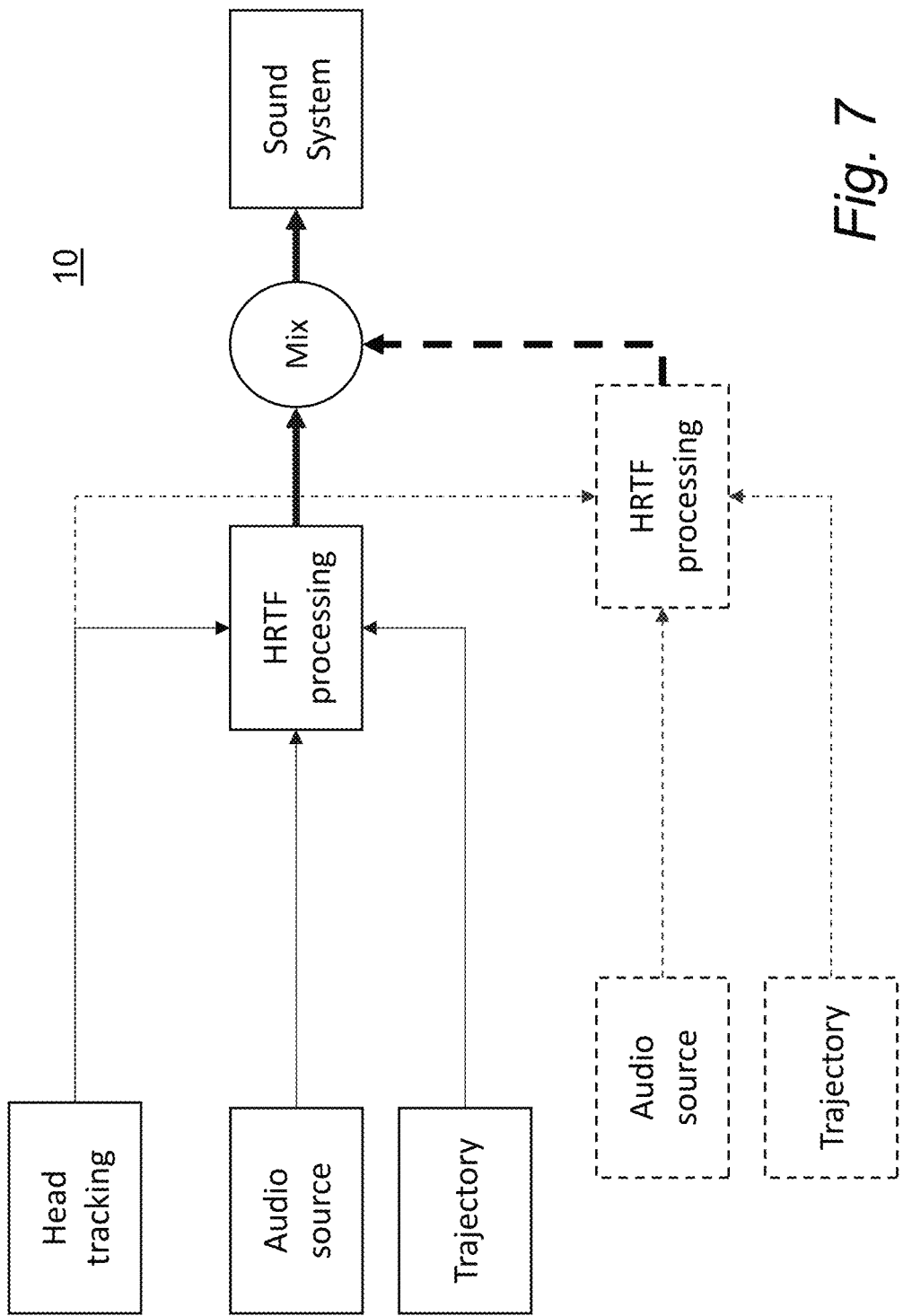
FIG. 7 is a schematic block diagram showing an example of a HRTF filter system where several audio sources at different positions in space can be rendered along a 3D trajectory in space.

FIG. 7 is a schematic block diagram showing an example of a HRTF filter system where several audio sources at different positions in space can be rendered along a 3D trajectory in space. The HRTF processing block includes a system such as that shown in FIG. 6 and also takes input from the audio source's desired trajectory in space (provided by the Trajectory block) to apply the appropriate HRTF at any given time. The Mix block superposes several HRTF processed audio sources and outputs it to the Sound System.

It should be understood that the invention is not limited to a certain format of the data in the HRTF filter database. By way of example, the HRTF filter database can be represented by a collection of time-domain filter responses, or for example the data could be represented as some transform involving for example time, frequency and/or spatial dimensions. Other parts of the described system are not limited to a certain form of the data either.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

FIG. 8 is a schematic block diagram illustrating an example of an arrangement/system 100, based on a processor-memory implementation according to an embodiment. In this particular example, the arrangement/system 100 comprises a processor 110 and a memory 120, the memory 120 comprising instructions executable by the processor 110, whereby the processor is operative to implement the aspects of the proposed technology described herein.

Optionally, the arrangement/system 100 may also include a communication circuit 130. The communication circuit 130 may include functions for wired and/or wireless communication with other devices, but may simply be a suitable input/output (I/O) device, input port(s) and/or output port(s).

It is also possible to provide a solution based on a combination of hardware and software. The actual hardware-software partitioning can be decided by a system designer based on a number of factors including processing speed, cost of implementation and other requirements.

Figure 9:
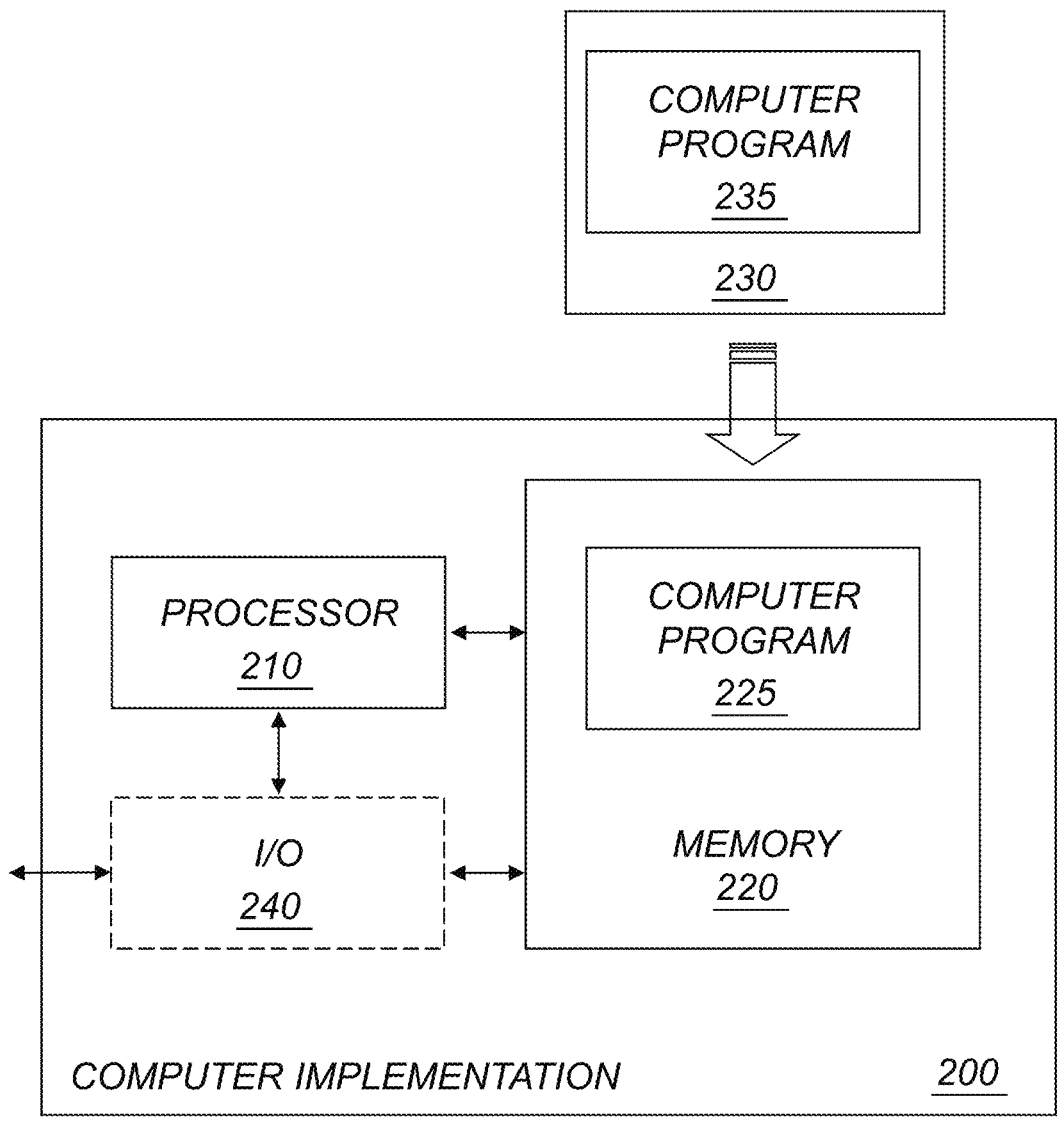
FIG. 9 is a schematic diagram illustrating an example of a computer-implementation according to an embodiment.

FIG. 9 is a schematic diagram illustrating an example of a computer-implementation 200 according to an embodiment. In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device 240 may also be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 210 is thus configured to perform, when executing the computer program 225, well-defined processing tasks such as those described herein.

The processing circuitry does not have to be dedicated to only execute the above-described steps, functions, procedure and/or blocks, but may also execute other tasks.

In a particular embodiment, the computer program 225; 235 comprises instructions, which when executed by at least one processor 210, cause the processor(s) 210 to perform the tasks described herein, including tasks related to the filer selection system, the filter system and/or the database constructing system.

According to an aspect of the proposed technology, there is provided a computer program comprising instructions, which when executed by at least one processor, cause the at least one processor to:
  obtain head-tracking data representing a head pose, also referred to as a head position, relative to a torso pose of an intended subject; and
  select a representation of a Head Related Transfer Function, HRTF, from a HRTF database, based on the head-tracking data and information representative of the position and/or direction of a sound source; and
  determine the audio filter based on the selected HRTF representation.

According to another aspect of the proposed technology, there is provided a computer program comprising instructions, which when executed by at least one processor, cause the processor(s) to:
  obtain head-tracking data representing a head pose, also referred to as a head position, relative to a torso pose of an intended subject;
  select a representation of a Head Related Transfer Function, HRTF, from a HRTF database, based on the head-tracking data and information representative of the position and/or direction of a sound source; and
  determine an audio filter based on the selected HRTF representation; and
  apply the audio filter on audio data.

According to yet another aspect of the proposed technology, there is provided a computer program comprising instructions, which when executed by at least one processor, cause the processor(s) to:
  obtain head-tracking data representing a head pose, also referred to as a head position, relative to a torso pose of an intended subject;
  select a representation of a Head Related Transfer Function, HRTF, from a HRTF database, based on the head-tracking data and information representative of the position and/or direction of a sound source; and
  determine an audio filter based on the selected HRTF representation;
  apply the audio filter on audio data to process the audio data; and
  forward the processed audio data to a sound system for enabling sound reproduction.

There is also provided a computer-program product comprising a computer-readable medium having stored thereon such a computer program.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The procedural flows presented herein may be regarded as a computer flows, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] Bosun Xie, *Head-Related Transfer Function and Virtual Auditory Display*, J Ross Publishing
[2] Brinkmann et. al., *Audibility and Interpolation of Head-Above-Torso Orientation in Binaural Technology*, IEEE Journal of Selected Topics in Signal Processing, Vol. 9, Issue 5, August 2015
[3] Ljung Lennart, *System Identification: Theory for the User* (2nd edition), Prentice Hall PTR, 1999
[4] Farina A., *Simultaneous measurement of impulse response and distortion with a swept-sine technique.* Presented at the 108th Convention 2000 Feb. 19-22, Paris, France

The invention claimed is:

1. A method for determining an audio filter, the method comprising:
obtaining head-tracking data representing a head pose, which is a head position, relative to a torso pose of an intended subject, the head pose being defined by the pitch, roll and/or yaw of the head in relation to the torso;
selecting a representation of a Head Related Transfer Function (HRTF) from a HRTF database, based on:
the head-tracking data representing the head pose relative to the torso pose, and
information representative of the position and/or direction of a sound source,
whereby the head pose input is combined with source direction information to select one or more representations of HRTFs from the HRTF database; and
determining the audio filter based on the selected HRTF representation.

2. The method of claim 1, wherein the representation of the HRTF includes at least a subset of the HRTF and/or a processed version of at least a subset of the HRTF, and/or wherein the HRTF representation is selected for use as the audio filter or for use as input to determine the audio filter by additional calculations.

3. The method of claim 1, wherein the HRTF database comprises a plurality of representations of HRTFs stored in the memory locations of the database,
wherein each HRTF representation is stored together with associated head-tracking data representing a head pose relative to a torso pose of an intended subject and information representative of the position and/or direction of a sound source, and the obtained head-tracking data is used together with information representative of the position and/or direction of a sound source as input to the HRTF database to find matching head-tracking and position/direction data stored in the HRTF database and extracting the associated HRTF representation from the HRTF database.

4. The method of claim 1, wherein the HRTF database comprises representations of binaural HRTFs and the selected HRTF representation is a representation of a binaural HRTF associated in the database with stored head-tracking data matching the obtained head-tracking data used as input to the HRTF database.

5. An audio filter selection system comprising:
at least one processor configured to
obtain head-tracking data representing a head pose, which is a head position, relative to a torso pose of an intended subject, the head pose being defined by the pitch, roll and/or yaw of the head in relation to the torso,
select a representation of a Head Related Transfer Function (HRTF) from a HRTF database, based on:
the obtained head-tracking data representing the head pose relative to the torso pose, and
information representative of the position and/or direction of a sound source,
whereby the at least one processor is configured to combine head pose input with source direction information to select one or more representations of HRTFs from the HRTF database, and
determine an audio filter based on the selected HRTF representation.

6. The audio filter selection system of claim 5, further comprising an audio filter selection block configured to use the head-tracking data to select the HRTF representation from the HRTF database, and
wherein the audio filter selection block is a HRTF selection block configured to combine the head pose input from a head tracker and source direction information from an audio source block to select one or more representations of HRTFs from the HRTF database.

7. The audio filter selection system of claim 5, wherein the HRTF database comprises a plurality of representations of HRTFs stored in the memory locations of the database,
wherein each HRTF representation is stored together with associated head-tracking data representing a head pose relative to a torso pose of an intended subject and information representative of the position and/or direction of a sound source, and
wherein the audio filter selection system is configured to use the obtained head-tracking data together with information representative of the position and/or direction of a sound source as input to the HRTF database to find matching head-tracking and position/direction data stored in the HRTF database and extract the associated HRTF representation from the HRTF database.

8. A method for audio filtering, the method comprising:
obtaining head-tracking data representing a head pose, which is a head position, relative to a torso pose of an intended subject, the head pose being defined by the pitch, roll and/or yaw of the head in relation to the torso;
selecting a representation of a Head Related Transfer Function (HRTF) from a HRTF database, based on:
the head-tracking data representing the head pose relative to the torso pose, and
information representative of the position and/or direction of a sound source,
whereby the head pose input is combined with source direction information to select one or more HRTFs from the HRTF database;
determining an audio filter based on the selected HRTF representation; and
applying the audio filter on audio data.

9. The method of claim 8, wherein the representation of the HRTF includes at least a subset of the HRTF and/or a processed version of at least a subset of the HRTF.

10. The method of claim 8, wherein the HRTF representation is selected for use as the audio filter or for use as input to determine the audio filter by additional calculations.

11. The method of claim 8, wherein the HRTF database comprises a plurality of representations of HRTFs stored in the memory locations of the database,
wherein each HRTF representation is stored together with associated head-tracking data representing a head pose relative to a torso pose of an intended subject and information representative of the position and/or direction of a sound source, and the obtained head-tracking data is used together with information representative of the position and/or direction of a sound source as input to the HRTF database to find matching head-tracking and position/direction data stored in the HRTF database and extracting the associated HRTF representation from the HRTF database.

12. An audio filter system comprising:
at least one processor configured to
obtain head-tracking data representing a head pose, which is a head position, relative to a torso pose of an intended subject, the head pose HisHbeing defined by the pitch, roll and/or yaw of the head in relation to the torso,
select a representation of a Head Related Transfer Function (HRTF) from a HRTF database, based on:
the obtained head-tracking data representing the head pose relative to the torso pose, and
information representative of the position and/or direction of a sound source,
whereby the audio filter system is configured to combine head pose input with source direction information to select one or more representations of HRTFs from the HRTF database,
determine an audio filter based on the selected HRTF representation, and
apply the audio filter on audio data.

13. The audio filter system of claim 12, further comprising a HRTF selection block configured to combine the head pose input from a head tracker and source direction information from an audio source block to select one or more representations of HRTFs from the HRTF database.

14. A system for sound reproduction comprising:
at least one processor configured to
obtain head-tracking data representing a head pose, which is a head position, relative to a torso pose of an intended subject, the head pose being defined by the pitch, roll and/or yaw of the head in relation to the torso,
select a representation of a Head Related Transfer Function (HRTF) from a HRTF database, based on:
the obtained head-tracking data representing the head pose relative to the torso pose, and
information representative of the position and/or direction of a sound source,
whereby the system is configured to combine head pose input with source direction information to select one or more representations of HRTFs from the HRTF database,
determine an audio filter based on the selected HRTF representation,
apply the audio filter on audio data to process the audio data, and
the processed audio data to a sound system for sound reproduction.

15. The system for sound reproduction of claim 14, wherein the system is a sound rendering system, which is configured to use the HRTF database, a head-tracking device, audio input for a sound source at a desired position and select and apply appropriate representations of HRTFs from the database to output audio data for the sound system.

16. The system for sound reproduction of claim 14, wherein the system is configured to process several sound sources at different positions by parallel rendering blocks.

17. The system for sound reproduction of claim 14, wherein the system is configured to create a virtual home theater loudspeaker set-up by combining virtual sound sources positioned in a home theater configuration.

18. The system for sound reproduction of claim 14, wherein the system is a binaural 3D sound rendering system.

19. The system for sound reproduction of claim 14, wherein the system is implemented with a mobile phone, a computer, a tablet, a headphone, or a Virtual Reality, Augmented Reality and/or X-Reality headset.

20. A non-transitory computer-readable medium having stored thereon a computer program comprising instructions, which when executed by at least one processor, cause the at least one processor to:
obtain head-tracking data representing a head pose, which is a head position, relative to a torso pose of an intended subject, the head pose being defined by the pitch, roll and/or yaw of the head in relation to the torso;
select a representation of a Head Related Transfer Function (HRTF) from a HRTF database, based on:
the head-tracking data representing the head pose relative to the torso pose, and
information representative of the position and/or direction of a sound source,
whereby the head pose input is combined with source direction information to select one or more representations of HRTFs from the HRTF database; and
determine the audio filter based on the selected HRTF representation.

* * * * *